Feb. 20, 1934.   H. H. HAINES ET AL   1,948,295
AERIAL DISPLAY
Filed April 25, 1931
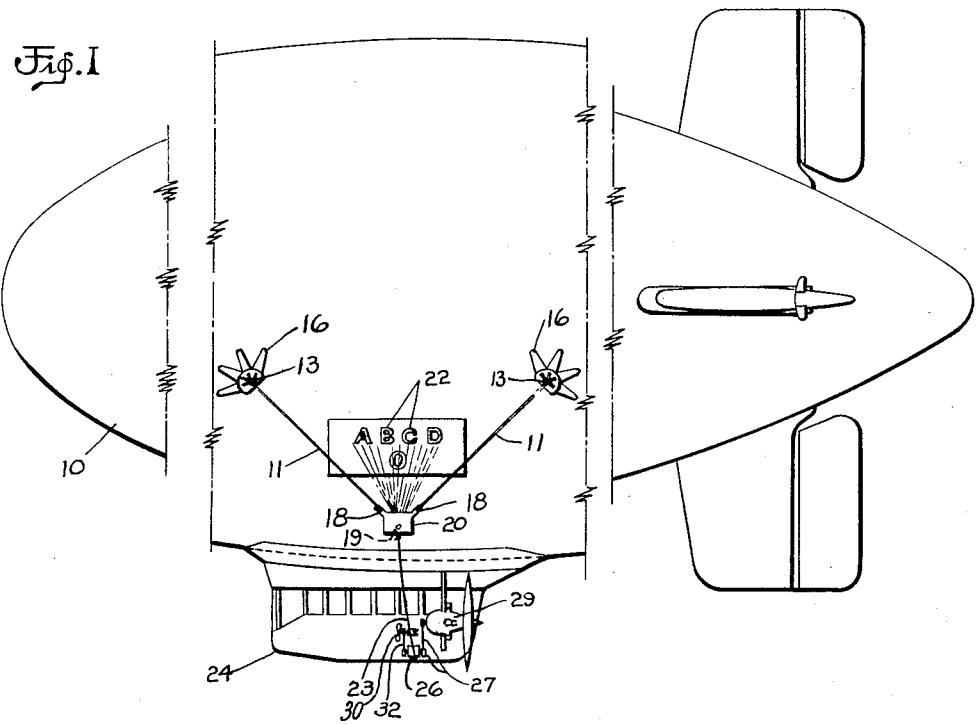
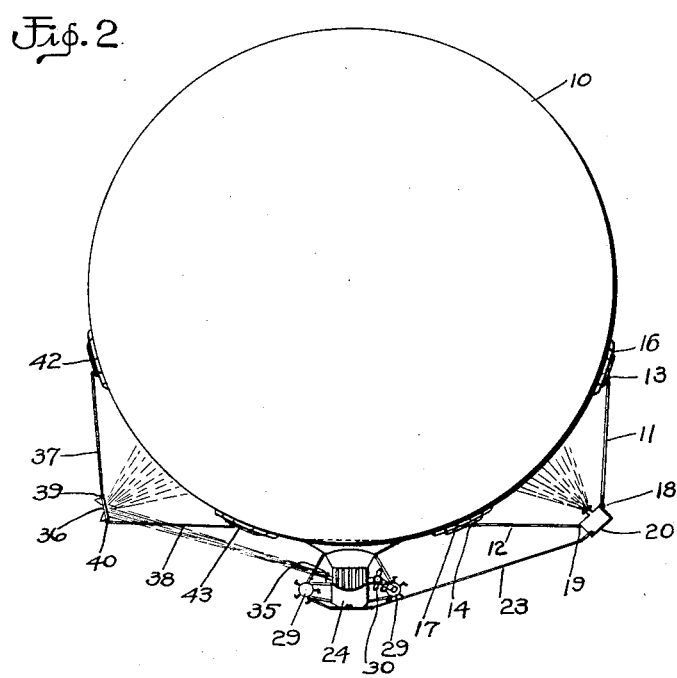
Inventors
Harry H. Haines and
Karl L. Lange
By R. S. Trogner
Attorney Patented Feb. 20, 1934

1,948,295

UNITED STATES PATENT OFFICE 1,948,295

AERIAL DISPLAY

Harry H. Haines and Karl L. Lange, Akron, Ohio, assignors to Wingfoot Corporation, Wilmington, Del., a corporation of Delaware Application April 25, 1931. Serial No. 532,853

2 Claims. (Cl. 40—127)

This invention relates to aerial displays and it has particular relation to aerial advertising displays employed in conjunction with aircraft.

One object of the invention is to provide an aircraft in which means is provided for projecting advertising matter upon the aircraft surface.

Another object of the invention is to provide in an aircraft an image projecting machine and surfaces to receive the projected images.

Another object of the invention is to provide a continuously changing display of luminous advertising matter upon the outer surface of an aircraft in flight which is visible from relatively great distances by persons on the ground.

For a better understanding of the invention reference may now be had to the accompanying drawing forming a part of the specification, of which;

Figure 1 is a fragmentary diagrammatical side-elevational view of an aircraft having the invention incorporated therein; and Figure 2 is a diagrammatical front elevational view of the aircraft shown by Figure 1.

In practicing the invention an aircraft 10 is provided with outriggers 11 and 12 which have inner end connections 13 and 14 to patches 16 and 17 secured to the surface of the aircraft. The outer ends of the outriggers are provided with connections 18 and 19 for securing them to an image projecting machine 20 which faces the surface of the aircraft.

It will be observed that the common plane of the outriggers 11 is substantially vertical and that the outrigger 12 projects substantially horizontally from the side of the aircraft. This arrangement provides for a suitable mounting of the projecting machine spaced at a proper distance from the surface of the aircraft, and by adjusting the outriggers the machine is so mounted as to be at the proper angle for the most effective projection of images 22 upon the aircraft surface.

Any type of conventional projecting machine may be employed, preferably one which is electrically operated, and since its construction is common knowledge, a description of it is not necessary for purposes of this invention. Suffice it to say that electric conductors 23 extend from a pilot car or gondola 24 wherein they are connected to an electric generator 26 that has driving connections 27 to a motor 29 which supplies driving power for the aircraft.

As an alternative means for driving the generator, a wind motor 30 is mounted upon any convenient portion of the aircraft and is provided with driving connections 32 to the generator. The driving connections 27 and 32 may be operated selectively. Since the generator is a conventional commercial unit, specific description of it is not included in this specification.

Under certain conditions it may be desirable to provide an electrically operated projecting machine 35 in the gondola 24 and a mirror 36 mounted in a position similar to that of the projecting machine 20. Suitable outriggers 37 and 38, having connections 39 and 40 for securing them to the mirror and patch connections 42 and 43 for securing them to the airship surface, support the mirror in a proper position with respect to the projecting machine. In this kind of arrangement the images are projected against the mirror and are reflected therefrom to the surface of the airship. If desirable, the surface of the mirror may be so formed or shaped as to insure proper size and shape of the images to be projected against the aircraft.

It is to be understood that one or more projecting machines may be mounted upon the outriggers 11 and 12 and operated alternatively or concurrently.

From this description it will be apparent that the aircraft pilot in the gondola 24 can control the operation of the projecting machine at will, and that various features of advertising matter or other displays may be projected from the side of the aircraft as it is navigated above any desirable location. This kind of display is very effective because it is unusual and immediately commands attention from a wide range of observers.

Although we have illustrated only the preferred forms which the invention may assume and have described those forms in detail, it will be apparent to those skilled in the art that the invention is not so limited but that various modifications may be made therein without departing from the spirit of the invention or from the scope of the appended claims.

What we claim is:

1. In an aircraft having a pilot car thereon, outriggers secured to the opposite sides of the aircraft and independent of the pilot car, means secured to the outriggers for transmitting luminous images to the aircraft surface, and means in the pilot car for controlling transmission of said images to the aircraft surface.

2. In an aircraft, a gondola provided with a motor, an electrical generator driven by the motor, a projecting machine having outriggers supporting it upon the aircraft independent of the gondola, electrical connections between the generator and the projecting machine for controlling projection of luminous images against the surface of the aircraft, the control for said electric generator being positioned in the gondola.

HARRY H. HAINES.
KARL L. LANGE.